May 6, 1952     J. R. RAPER ET AL     2,596,080
IONIZATION CHAMBER
Filed Feb. 21, 1947
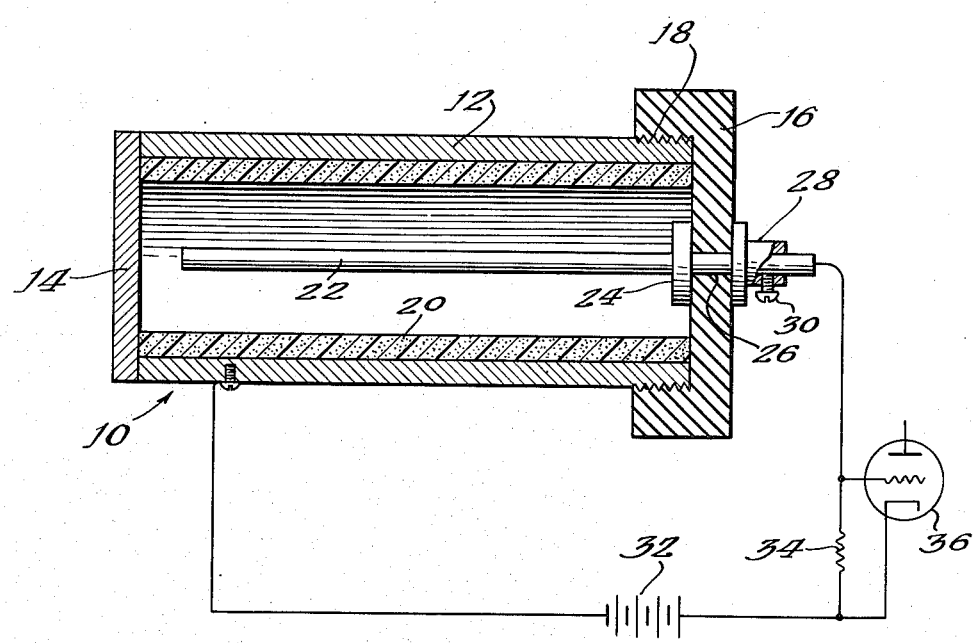
INVENTORS:
John R. Raper
Raymond E. Zirkle
By Robert A. Lounder
Attorney Patented May 6, 1952

2,596,080

UNITED STATES PATENT OFFICE 2,596,080

IONIZATION CHAMBER

John R. Raper and Raymond E. Zirkle, Chicago, Ill., assignors to the United States of America as represented by the United States Atomic Energy Commission Application February 21, 1947, Serial No. 730,136

15 Claims. (Cl. 313—93)

This invention relates to an improvement in instruments for detecting and measuring nuclear particles and radiations, particularly gamma rays and neutrons. More specifically, the invention relates to an improved ionization chamber for the measurement of intensity of gamma radiations and fast neutron flux.

A common device for the measurement of radioactivity is an ionization chamber. In such a chamber, ionizing particles, such as alpha particles or beta particles, traverse a gaseous medium and ionize the gas in their path. The gaseous medium is located between a pair of conducting electrodes which are at different electrical potentials so that the positive ions so created are collected on the negative electrode, and the negative ions on the positive electrode. This ion current flows through an exterior circuit. The current thus produced in the exterior circuit is proportional to the total amount of ionization occurring within the chamber.

It is often desired to employ an ionization chamber for the measurement of particles and emanations which are not in themselves ionizing, such as gamma radiations and neutrons. Although gamma rays are not in themselves ionizing, they produce a certain number of beta particles by interaction with the atoms of matter upon which they impinge. Such reactions are primarily of the types known as the photoelectric effect and the Compton effect, in both of which the gamma ray releases electrons (beta particles) from the atoms of the material upon which they impinge. Thus an ionization chamber is used for the detection and measurement of gamma rays which are in themselves not ionizing. As is by now well known in the art, the extent to which any given intensity and energy of gamma or X-ray radiation produces ionizing particles, and the ionizing characteristics of the particles so produced, are functions of the average atomic weight of the substance so struck by the radiation.

The effect described above takes place in the walls and electrodes of the ionization chamber and in the ionizing medium. Where the gaseous ionizing medium has a fairly low pressure, the production of ionizing beta particles occurs primarily in the walls and electrodes. A common measure of the intensity of gamma radiation is in terms of the ionization so indirectly produced in a unit volume of air at atmospheric pressure. In making measurements in terms of such units, commonly roentgens, it is desirable that the walls and electrodes, in which most of the production of beta particles occurs, have an average atomic weight similar to that of air. Such chambers are in common use.

In the measurement of fast neutrons with an ionization chamber, it is likewise necessary to employ what may be termed a secondary effect to produce the ionization since neutrons also are incapable of producing ionization directly. The nuclear reaction in common use for this purpose is the proton recoil. The proton, which is the nucleus of the hydrogen atom, has essentially the same mass as an incident neutron. Thus, when a neutron of high energy, commonly called a "fast" neutron, strikes the hydrogen nucleus an elastic collision occurs and the energy of the neutron is transferred to the proton which is, of course, a positively charged particle capable of producing ionization. The neutron likewise may transfer its energy to the nuclei of atoms other than the hydrogen nucleus. In such a case the energy transferred, and thus the ionizing ability of the resultant charged particle, is much less because of the absence of complete energy transfer in a collision between particles of unequal mass. The average energy imparted to the resultant recoil nucleus (charged particle) may be expressed as:

$$E = \frac{2AE_o}{(A+1)^2}$$

where E is the energy of the recoil nucleus, A is the atomic weight and $E_o$ is the energy of the impinging neutron.

By inspection of the above equation, it may be seen that the ionizing characteristics of the ionizing particles produced by fast neutrons will not be merely a function of the average atomic weight, but will depend also on the components which enter into the average.

The present invention is particularly concerned with ionization chambers for measuring the intensity of flux fields of gamma radiation and fast neutron radiation not in terms of the ionization produced in air but in terms of the ionization produced in animal tissue, particularly human tissue. The ionization produced in human tissue by any given beam of gamma radiation or neutron flux is not necessarily proportional to the ionization produced in air. Since the ionization so indirectly produced by any given flux of non-ionizing particles and radiations is dependent not only on the intensity, but also on the energies, of the particles and radiations present, and since the energy dependence is a variable depending upon the atomic structure of the medium in which ionizing particles are produced by the non-ionizing particles, it is necessary to employ as such medium a material similar in atomic composition to the material in terms of which it is desired that the ionizing ability of the flux or beam under measurement be measured.

The damage caused to human tissue by incident particles and radiations is due to ionization occurring within the tissue. Thus a measure of the ionization produced in an ionization chamber by incident radiation constitutes a measure of the body damage which would occur by reason of exposure to the radiation so measured. However, such correspondence is independent of the energy characteristics of the beam or flux under measurement only to the extent that the medium in which the non-ionizing particles produce ionizing particles corresponds in characteristics to those of human tissue.

Accordingly, it is the principal object of this invention to provide an ionization chamber in which the ionization brought about by the impingement of neutrons and gamma rays is proportional to the damage which would be produced in human tissue.

It is a further object of the invention to provide an ionization chamber having a wall electrode having an atomic composition such as to produce ionizing particles as a result of the impingement of fast neutrons and gamma rays in a manner similar to such production in human tissue.

It is a yet further object of the invention to provide a conducting material which responds to fast neutrons and gamma rays in respect to the production of ionizing particles in substantially the same manner as human tissue.

For understanding of the invention, reference is made to the single figure of the drawing in which is shown a central cross-sectional view of an elementary type of ionization chamber embodying the teachings of the invention, together with a schematic diagram of a portion of the electrical circuit associated therewith.

Referring to the drawing, the numeral 10 designates generally an ionization chamber. The housing or container 12 is a cylinder of a conducting material such as brass, for example, having an end plate 14 fastened thereto, for example by solder. At the opposite end of the housing 12 is an insulating cap 16, preferably of polystyrene or a similar material having high insulation resistance. The cap 16 is secured to the housing 12 by threads 18 machined in both of said elements. Within the housing 12 is a tubular electrode 20, preferably fabricated of a homogeneous mixture comprising 90 per cent (by weight) methyl methacrylate resin and 10 per cent graphite, as more fully discussed below. The tubular electrode 20 has an outer diameter adapted to fit tightly into the inner diameter of the tubular housing 12.

Axially of the chamber 10 is a central electrode 22 comprising a rod of a conducting material such as brass having a collar portion 24 near an end thereof and protruding outwardly through a central aperture 26 in the insulating cap 16. The central electrode 22 is held in place by means of a collar 28 fitting over the protruding end thereof and provided with a set screw 30. The housing 12 is electrically connected to the negative terminal of a voltage source 32. Persons skilled in the art will readily understand that the required voltage value of the voltage source 32 is a function of the dimensions of the ionization chamber 12, and the pressure and nature of the gas contained therein; and they will likewise be able to select the proper voltage value in accordance with any particular dimensions and filling for the chamber 10. The positive terminal of the voltage supply 32 is connected to the central electrode 22 through a resistance 34, the voltage across which constitutes the input voltage to an electronic tube 36, which may be used in the conventional manner for measuring the voltage across the resistance 34.

Operation of the ionization chamber and circuit illustrated in the drawing need not be generally described here since persons familiar with the operation of conventional ionization chambers will readily see that with the exception of the composition and function of the electrode 20, the device of the drawing is a conventional ionization chamber of elementary design with its associated electrical circuit. For purposes of clarifying the teachings of the invention, the ionization chamber 10 illustrated is of a very elementary structure. The teachings of the present invention will readily be applied to other ionization chambers designed for particular purposes and having well-known improvements such as guard rings, shields, etc., which are not material to the present invention.

The present invention lies in the discovery that by introducing an electrode 20 of proper composition, the ionization which occurs in the ionization chamber 10, and the resultant voltage across the resistance 34, by reason of the impingement of fast neutrons or gamma rays on the chamber 10 will be proportional to the ionization which would be caused in human tissue, and, therefore, a measurement of the body damage which would be sustained by a human subjected to the flux or beam under measurement. In previous ionization chambers, it was necessary to know the energy spectrum of the incident particles and radiations in order to correct for the difference in energy dependence in production of ionizing particles between the wall or electrode and human tissue. It has been found that a mixture of 90 per cent methyl methacrylate resin and 10 per cent graphite as the material of the electrode 20 produces ionizing particles with much the same dependence upon the energy of the impinging non-ionizing gamma rays and fast neutrons as does human tissue.

The average atomic weight of the mixture described above is approximately the same as that of human tissue. When gamma rays traverse the chamber 10, a certain number of such gamma rays will produce ionizing beta particles in the housing 12. Such beta particles cannot, however, cause ionization of the gaseous ionizing medium between the electrodes 20 and 22 because the thickness of the electrode 20 is sufficient so that any such particles produced in the housing 12 will be completely absorbed in the electrode 20 before entering the ionizing medium. Therefore, the only ionizing particles entering the ionizing medium will be those originating in the material of the electrode 20. Since as stated above the average atomic weight of the electrode 20 is substantially the same as that of human tissue, and since the energy dependence of the production of ionizing particles in response to incident gamma rays is a function only of average atomic weight, the number and character of the ionizing particles entering the gaseous medium of the chamber 10 will be proportional to the number and character of the ionizing particles which would be produced by the beam or flux in human tissue. Therefore, the total ionization and thus the voltage across the resistance 34 constitutes an indication of the tissue injury properties of the incident gamma or X-ray radiation which is relatively independent of the energy spectrum thereof.

The mixture above described as the material of electrode 20 likewise presents highly desirable characteristics in the measurement of tissue injury properties of beams or flux fields of fast neutrons. As stated above, the energy dependence of the production of ionizing particles by fast neutrons cannot be procured by merely duplicating the average atomic weight of human tissue. The mixture described above has the highly desirable characteristic of having a ratio of approximately unity between hydrogen atoms and atoms of greater atomic weight, in this case mostly carbon, with some oxygen. Ideally, the wall electrode 20 would have the same atomic composition as human tissue. In such a composition the ratio of hydrogen atoms to heavier atoms would be approximately 1.7 to 1. In addition, the heavier atoms would consist not only of carbon and oxygen but would also include other elements such as nitrogen.

Attempts have been made in the past to find a material for electrodes and chamber walls having a hydrogen-to-heavier ratio approaching the theoretical optimum mentioned above. However, all such attempts have been subject to the objections that they failed to conduct electricity sufficiently, having a resistivity greater than 100 ohm-cm., or that they were so delicate as to render their use impractical, if not impossible. Although the present mixture, as stated above, does not meet the theoretical conditions, it has been found to produce measurements of tissue injury characteristics of fast neutron fields which are thoroughly satisfactory for most purposes, and it offers the great advantage of easy machinability and handling in addition to the fact that it has a resistivity as low as approximately 25 ohm-cm., and thus is an excellent electrode material for an ionization chamber. Furthermore, the present mixture offers the advantage of producing effects similar to those in body tissue not only in response to fast neutrons, but also in response to gamma radiation as described above.

Many variant applications of the teachings of this invention will readily occur to persons skilled in the art. For example, methyl methacrylate resin may be mixed with conducting substances other than graphite to produce the desired result. Likewise graphite may be used as a mixture with hydrogenous compounds other than methyl methacrylate, since carbon simulates the nuclear properties of the non-hydrogenous components of body-tissue to a high degree for these purposes. It will, therefore, be understood that the scope of the present invention shall be deemed to be limited only by the claims.

What is claimed is:

1. In a radiation-measuring instrument, in combination, a substantially tubular electrode composed of a homogeneous mixture of approximately 90 per cent methyl methacrylate resin and 10 per cent graphite, and a rod-like electrode axial of said tubular electrode.

2. In a radiation-measuring instrument, a plurality of electrodes, at least one of said electrodes comprising a homogeneous mixture of approximately 90 per cent methyl methacrylate resin and 10 per cent graphite, and a rod-like electrode axial of said tubular electrode.

3. In a radiation-measuring device, an element adapted to produce ionizing particles in response to fast neutrons and gamma rays in a manner similar to human tissue, said element comprising a homogeneous mixture of approximately 90 per cent methyl methacrylate resin and 10 per cent graphite.

4. In a radiation-measuring instrument, in combination, a substantially tubular electrode composed of a homogeneous mixture of methyl methacrylate resin with a conducting substance in such proportions as to have the average atomic weight of human tissue.

5. In a radiation-measuring instrument, a plurality of electrodes, at least one of said electrodes comprising a homogeneous mixture of methyl methacrylate resin with a conducting substance in such proportions as to have the average atomic weight of human tissue.

6. In a radiation-measuring device, an element adapted to produce ionizing particles in response to fast neutrons in a manner similar to human tissue, said element comprising a homogeneous mixture of methyl methacrylate resin with a conducting substance in such proportions as to have the average atomic weight of human tissue.

7. An ion chamber of the class described having two electrodes, at least one of which comprises an electrically conductive composition consisting of approximately 10 per cent graphitic carbon and 90 per cent of a methyl methacrylate polymer and having approximately the same average atomic weight as human tissue, and a hydrogen-to-heavier ratio of approximately unity.

8. An ion chamber of the class described having an outer electrode which comprises a hollow, cylindrically shaped member constructed of an electrically conductive, moldable material consisting of approximately 10 per cent graphitic carbon and 90 per cent of a methyl methacrylate polymer and having approximately the same average atomic weight as human tissue and a hydrogen-to-heavier ratio of approximately unity, and an inner collecting electrode which extends within, and coaxially of, said outer electrode.

9. An ion chamber of the class described comprising an outer casing constructed of material which is permeable to radiation, and a pair of spaced apart, insulated electrodes disposed within said casing, one of said electrodes comprising a tubular member constructed at least in part of an electrically conductive material of approximately the same average atomic weight as human tissue and having a hydrogen-to-heavier ratio of approximately unity, the other of said electrodes being disposed centrally of said tubular outer electrode.

10. An ion chamber of the class described comprising a tubular, outer casing constructed of material which is permeable to radiation, and a pair of spaced apart, insulated electrodes disposed within said casing, one of said electrodes comprising a tubular member which is constructed at least in part of a composition of 90 per cent methyl methacrylate polymer and an electrically conductive graphitic carbon, said composition having approximately the same average atomic weight as human tissue and having a hydrogen-to-heavier ratio of approximately unity, and the the other of said electrodes comprising a rod-like member which extends centrally of said tubular electrode.

11. An ion chamber having a plurality of electrodes characterized by the improvement wherein at least one of the electrodes consists of a homogeneous mixture of methyl methacrylate resin and a conducting material, said mixture having an atomic weight approximately equal to the atomic weight of human tissue and having a hydrogen-to-heavier ratio of approximately unity.

12. An ion chamber having a plurality of electrodes characterized by the improvement wherein at least one of the electrodes consists of a homogeneous mixture of approximately 10 per cent graphitic carbon and 90 per cent methyl methacrylate polymer.

13. An ion chamber having a plurality of electrodes characterized by the improvement wherein at least one of the electrode consists of a composition having a hydrogen-to-heavier ratio approximately equal to the hydrogen-to-heavier ratio of human tissue.

14. An ionization chamber comprising the elements of claim 13 wherein the hydrogen-to-heavier ratio is between the limits of 1 and 1.7.

15. An ionization chamber having a plurality of electrodes characterized by the improvement wherein at least one of the electrodes has a hydrogen-to-heavier ratio approximately equal to the hydrogen-to-heavier ratio of human tissue, and has an atomic weight approximately equal to the atomic weight of human tissue.

JOHN R. RAPER.
RAYMOND E. ZIRKLE.

REFERENCES CITED

The following references are of record in the file of this patent:

UNITED STATES PATENTS

| Number | Name | Date |
|---|---|---|
| 2,041,213 | Schellenger et al. | May 19, 1936 |
| 2,376,196 | Scherbatskoy | May 15, 1945 |
| 2,536,991 | Wollan et al. | Jan. 2, 1951 |